United States Patent
Tomita et al.

(10) Patent No.: US 11,217,976 B2
(45) Date of Patent: Jan. 4, 2022

(54) ELECTRIC WIRE FIXING STRUCTURE, ELECTRICAL CONNECTION BOX, AND WIRE HARNESS

(71) Applicant: Yazaki Corporation, Tokyo (JP)

(72) Inventors: Kei Tomita, Shizuoka (JP); Daiki Yamamoto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 17 days.

(21) Appl. No.: 16/664,937

(22) Filed: Oct. 27, 2019

(65) Prior Publication Data

US 2020/0176961 A1 Jun. 4, 2020

(30) Foreign Application Priority Data

Nov. 29, 2018 (JP) .............................. JP2018-223209

(51) Int. Cl.
*H02G 3/08* (2006.01)
*B60R 16/02* (2006.01)
*H01B 7/00* (2006.01)
*H02G 3/14* (2006.01)

(52) U.S. Cl.
CPC ......... *H02G 3/083* (2013.01); *B60R 16/0215* (2013.01); *H01B 7/0045* (2013.01); *B60R 16/0207* (2013.01); *H02G 3/14* (2013.01)

(58) Field of Classification Search
CPC ............ H02G 3/16; H02G 3/083; H02G 3/14; H02G 3/0083; H05K 5/0247; B60R 16/0207; B60R 16/0215; H01B 7/0045
See application file for complete search history.

(56) References Cited

U.S. PATENT DOCUMENTS

| | | | | |
|---|---|---|---|---|
| 4,842,550 A * | 6/1989 | Fry, Jr | ............... | H01R 13/5829 439/471 |
| 6,045,394 A * | 4/2000 | Matsuoka | .......... | H01R 13/5804 439/464 |
| 6,225,557 B1 * | 5/2001 | Fonteneau | ........... | H01R 13/506 174/50 |
| 7,422,443 B2 * | 9/2008 | Kaneko | .................. | H05K 7/026 439/76.2 |
| 7,622,674 B2 * | 11/2009 | Kanamaru | ............. | H05K 7/026 174/50 |
| 8,043,111 B2 * | 10/2011 | Takahashi | ................ | F16L 33/02 439/464 |
| 8,057,245 B2 * | 11/2011 | Sakamaki | ........ | H01R 13/62933 439/157 |
| 8,426,737 B2 * | 4/2013 | Maebashi | ........... | B60R 16/0238 174/152 R |

(Continued)

FOREIGN PATENT DOCUMENTS

JP 2012-29431 A 2/2012

*Primary Examiner* — Paresh H Paghadal
(74) *Attorney, Agent, or Firm* — Kenealy Vaidya LLP

(57) ABSTRACT

An electric wire fixing structure includes a first half hole part and a second half hole part formed by dividing an electric wire hole through which an electric wire is passed; an electric wire fixing part formed in a shape along the first half hole part when viewed in the axial direction of the electric wire hole, the electric wire fixing part extending from the first half hole part in the axial direction of the electric wire hole; and a fixing member wound around the electric wire and the electric wire fixing part together, so as to fix the electric wire to the electric wire fixing part.

3 Claims, 10 Drawing Sheets

(56) References Cited

U.S. PATENT DOCUMENTS

| | | | | |
|---|---|---|---|---|
| 8,480,417 B2 * | 7/2013 | Suemitsu | ............... | H01R 13/46 |
| | | | | 439/157 |
| 8,568,159 B2 * | 10/2013 | Noda | ................ | H01R 13/5812 |
| | | | | 439/470 |
| 8,927,858 B2 | 1/2015 | Sato et al. | | |
| 9,178,302 B2 * | 11/2015 | Suemitsu | ............... | H01R 13/56 |
| 9,837,756 B2 * | 12/2017 | Toyoda | ................ | H01R 13/567 |
| 2002/0170736 A1 * | 11/2002 | Yamashita | ......... | H01R 13/5837 |
| | | | | 174/84 R |
| 2007/0249189 A1 * | 10/2007 | Kaneko | .................. | H05K 7/026 |
| | | | | 439/76.2 |
| 2008/0257600 A1 * | 10/2008 | Kanamaru | .......... | B60R 16/0222 |
| | | | | 174/535 |
| 2008/0303272 A1 * | 12/2008 | Takahashi | ........... | F16L 25/0045 |
| | | | | 285/305 |
| 2013/0122728 A1 * | 5/2013 | Kobayashi | ......... | H01R 13/5213 |
| | | | | 439/136 |
| 2014/0154896 A1 * | 6/2014 | Makino | .................. | H02G 3/088 |
| | | | | 439/76.2 |
| 2016/0303669 A1 * | 10/2016 | Harris | .................... | B23D 55/10 |
| 2016/0315455 A1 * | 10/2016 | Kiyota | ................ | B60R 16/0238 |
| 2017/0063069 A1 * | 3/2017 | Kawada | ............... | H02G 3/081 |
| 2017/0085067 A1 * | 3/2017 | Sugimoto | .......... | H01R 13/5812 |
| 2018/0062312 A1 * | 3/2018 | Shindo | ............. | H01R 13/62955 |
| 2019/0061651 A1 * | 2/2019 | Takahashi | ............ | H02G 3/0487 |

\* cited by examiner

ELECTRIC WIRE FIXING STRUCTURE, ELECTRICAL CONNECTION BOX, AND WIRE HARNESS

CROSS-REFERENCE TO RELATED APPLICATION(S)

The present application claims priority to and incorporates by reference the entire contents of Japanese Patent Application No. 2018-223209 filed in Japan on Nov. 29, 2018.

BACKGROUND OF THE INVENTION

1. Field of the Invention

The present invention relates to an electric wire fixing structure, an electrical connection box, and a wire harness.

2. Description of the Related Art

An electrical connection box mounted in vehicles, such as automobiles, is provided with an electric wire hole through which an electric wire routed inside and outside the electrical connection box is passed. The electric wire hole is provided with a member for fixing the electric wires. For example, an electrical connection box described in Japanese Patent Application Laid-open No. 2012-29431 is provided with a long and narrow thin plate for fixing an electric wire with an adhesive tape.

However, in the case where an electric wire hole through which an electric wire passes is structured to be divided, for example, into halves, when members resulting from the division of the electric wire hole are combined in a state in the electric wire is routed in one of the divided electric wire holes, there is a possibility that the electric wire is pinched between the combined members. Thus, there has been a risk of causing difficulty in appropriately assembling an electrical connection box.

SUMMARY OF THE INVENTION

The present invention has been developed in consideration of the aforementioned situation. An object of the present invention is to provide an electric wire fixing structure capable of preventing an electric wire from being pinched between members; an electrical connection box; and a wire harness.

An electric wire fixing structure according to one aspect of the present invention includes a first half hole part and a second half hole part, the first half hole part and the second half hole part being formed by dividing an electric wire hole through which an electric wire is passed; an electric wire fixing part formed in a shape along the first half hole part when viewed in an axial direction of the electric wire hole, the electric wire fixing part extending from the first half hole part in the axial direction of the electric wire hole; and a fixing member wound around the electric wire and the electric wire fixing part together, so as to fix the electric wire to the electric wire fixing part, wherein the electric wire fixing part is formed in a range in a circumferential direction of the first half hole part, the range being such that both ends of the electric wire fixing part in the circumferential direction of the first half hole part are formed apart from both ends of the first half hole part in the circumferential direction of the first half hole part.

According to another aspect of the present invention, in the electric wire fixing structure, it is preferable that a hook rim part to prevent the fixing member from moving in the axial direction of the electric wire hole is formed at an edge of the electric wire fixing part, the edge being on a side opposite to the first half hole part in the axial direction of the electric wire hole.

According to still another aspect of the present invention, in the electric wire fixing structure, it is preferable that the hook rim part is formed in a range in the circumferential direction of the first half hole part, the range being larger than a range in which the electric wire fixing part is formed in the circumferential direction of the first half hole part.

An electrical connection box according to still another aspect of the present invention includes a casing that accommodates an electronic component; and an electric wire fixing structure provided to the casing, the electric wire fixing structure including a first half hole part and a second half hole part, the first half hole part and the second half hole being formed by dividing an electric wire hole through which an electric wire is passed, an electric wire fixing part formed in a shape along the first half hole part when viewed in an axial direction of the electric wire hole, the electric wire fixing part extending from the first half hole part in the axial direction of the electric wire hole, and a fixing member wound around the electric wire and the electric wire fixing part together, so as to fix the electric wire to the electric wire fixing part, wherein the electric wire fixing part is formed in a range in a circumferential direction of the first half hole part, the range being such that both ends of the electric wire fixing part in the circumferential direction of the first half hole part are formed apart from both ends of the first half hole part in the circumferential direction of the first half hole part.

A wire harness according to still another aspect of the present invention includes a routing material having conductivity; and an electrical connection box connected to the routing material, the electrical connection box including a casing that accommodates an electronic component, and an electric wire fixing structure provided to the casing, the electric wire fixing structure including a first half hole part and a second half hole part, the first half hole part and the second half hole being formed by dividing an electric wire hole through which an electric wire is passed, an electric wire fixing part formed in a shape along the first half hole part when viewed in an axial direction of the electric wire hole, the electric wire fixing part extending from the first half hole part in the axial direction of the electric wire hole, and a fixing member wound around the electric wire and the electric wire fixing part together, so as to fix the electric wire to the electric wire fixing part, wherein the electric wire fixing part is formed in a range in a circumferential direction of the first half hole part, the range being such that both ends of the electric wire fixing part in the circumferential direction of the first half hole part are formed apart from both ends of the first half hole part in the circumferential direction of the first half hole part.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of an electric wire fixing structure, an electrical connection box, and a wire harness according to the present invention will be described in detail with reference to the drawings. Note that the present invention shall not be limited by the embodiments. Furthermore, constituents in the following embodiments include constituents that can be replaced by the constituents in the embodiments and are easily conceivable by a person skilled in the art, or constituents essentially identical to the constituents in the embodiments.

Note that, in the following descriptions, a horizontal direction under a state in which an electrical connection box 1 is arranged in a normal usage mode is defined as a horizontal direction in the present embodiment; an upward direction under the above-mentioned state is described as an upward direction or an upper side in the present embodiment; and a downward direction under the above-mentioned state is described as a downward direction or a lower side in the present embodiment.

Embodiments

Figure 1:
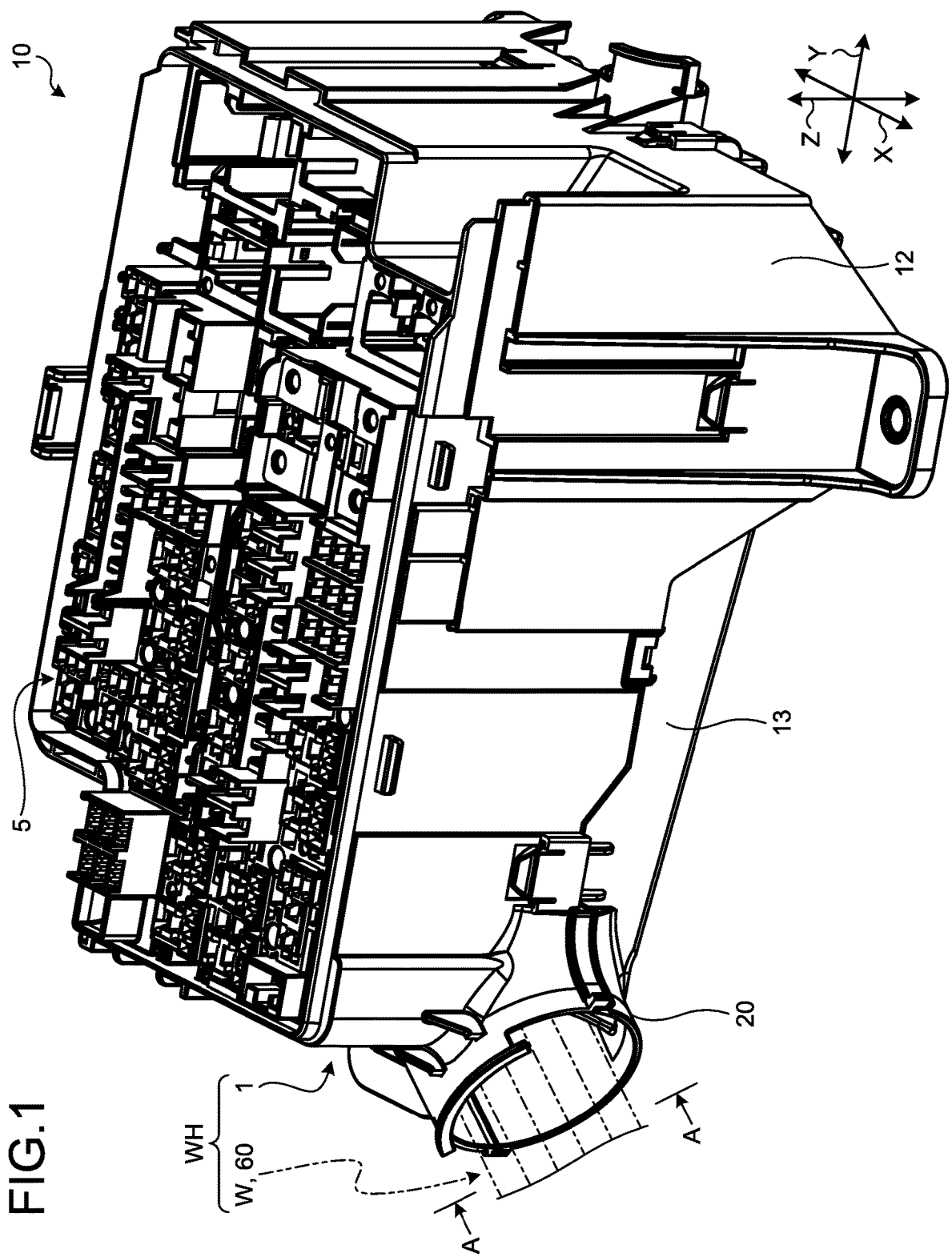
FIG. 1 is a perspective view of an electrical connection box according to an embodiment.

FIG. 1 is a perspective diagram of the electrical connection box 1 according to the present embodiment. The electrical connection box 1 in the embodiment is mounted in vehicles, such as automobiles, and incorporated into a wire harness WH. The wire harness WH have a configuration in which, for example, in order to establish connection between devices mounted in a vehicle, a plurality of routing materials W to be used for power source supply or signal communication is bundled to form a component assembly, and the routing materials W are connected to the devices by connectors, for example. The wire harness WH includes the routing materials W having conductivity and the electrical connection box 1 electrically connected to the routing materials W. Examples of the routing materials W include a metal bar, an electric wire, and an electric wire bundle. The metal bar is formed by coating the outside of a conductive bar member with an insulating coating part. The electric wire is formed by coating the outside of a conductor part (a core wire) including a plurality of conductive metal elemental wires with an insulating coating part. The electric wire bundle is formed by bundling a plurality of the electric wires. The wire harness WH has a configuration in which the routing materials W are bundled together, and electrically connected to the electrical connection box 1, for example, via a connector provided at the end of the bundled routing materials W. The wire harness WH may further include a grommet, a protector, and a fixture.

The electrical connection box 1 puts together electric components, such as a connector, a fuse, a relay, a capacitor, a branch part, and an electronic control unit, and accommodates these electric components therein. The electrical connection box 1 is provided in, for example, an engine room of a vehicle or a cabin of a vehicle. The electrical connection box 1 is connected, for example, via the routing material W, between a power source, such as a battery, and various electronic devices mounted in the vehicle. The electrical connection box 1 distributes electric power supplied from the power source to the electronic devices in the vehicle. The electrical connection box 1 is sometimes called, for example, a junction box, a fuse box, or a relay box, but, in the present embodiment, these boxes are collectively called an electrical connection box.

Specifically, the electrical connection box 1 includes a casing 10 and various electronic components 5. The casing 10 is formed from resin material and capable of accommodating the electronic components 5. The casing 10 includes a frame 12, an upper cover (not illustrated) attached to the upper portion of the frame 12, and an under cover 13 attached to the lower portion of the frame 12. Note that FIG. 1 is a diagram illustrating a state in which the upper cover is removed.

The casing 10 is provided with an electric wire path 20, serving as a path for an electric wire 60, through which the electric wire 60 constituting the routing material W passes over the inside and outside of the casing 10. The electric wire 60 to pass through the electric wire path 20 is formed of a bundle of a plurality of electric wires. The electric wire path 20 is arranged at a lower end position in the casing 10. In the present embodiment, the casing 10 is formed in a substantially rectangular parallelepiped shape, and the electric wire path 20 is formed at a lower end position in a corner of the rectangular parallelepiped so as to allow the electric wire 60 to pass through the electric wire path 20 in a substantially horizontal direction.

Figure 2:
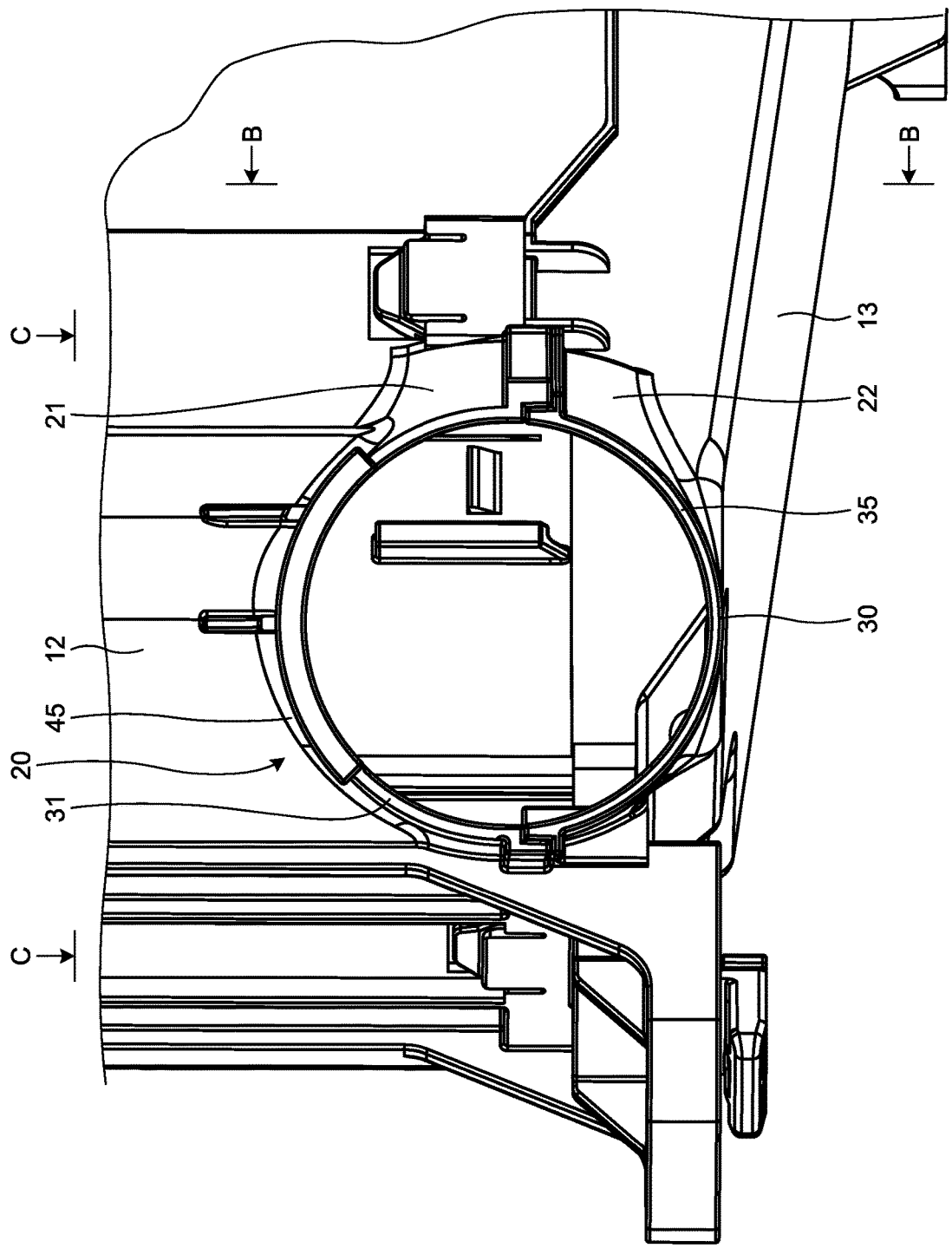
FIG. 2 is a diagram viewed from the direction of arrow A-A of FIG. 1.
Figure 3:
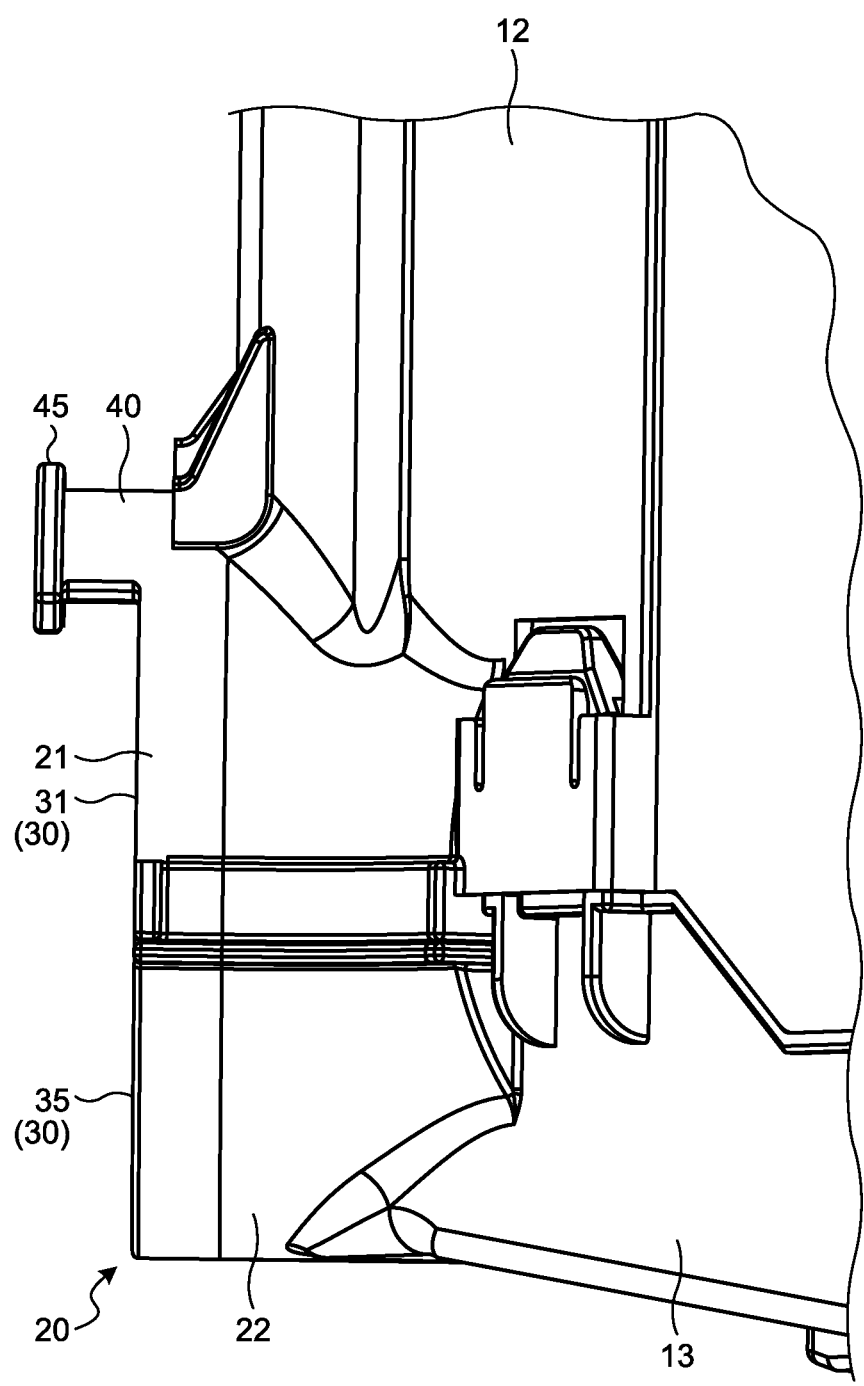
FIG. 3 is a diagram viewed from the direction of arrow B-B of FIG. 2.
Figure 4:
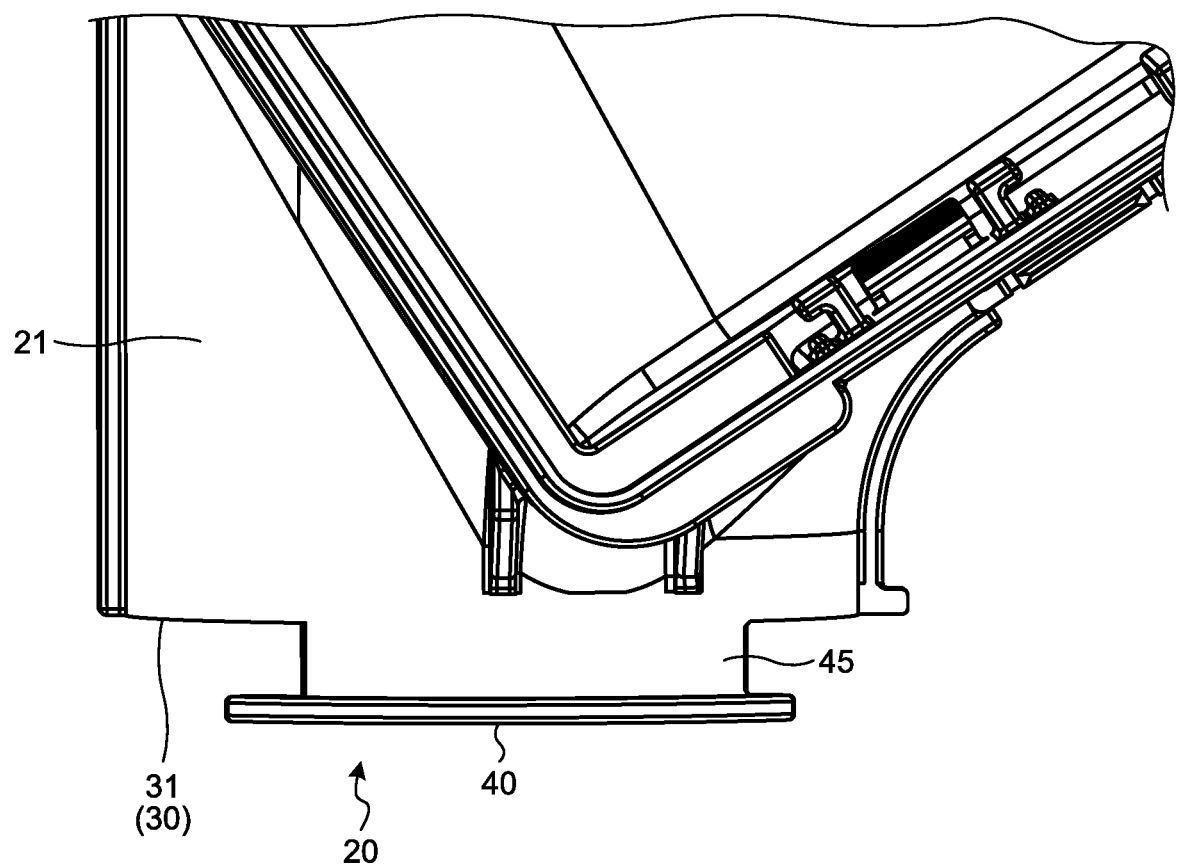
FIG. 4 is a diagram viewed from the direction of arrow C-C of FIG. 2.

FIG. 2 is a diagram viewed from the direction of arrow A-A of FIG. 1. FIG. 3 is a diagram viewed from the direction of arrow B-B of FIG. 2. FIG. 4 is a diagram viewed from the direction of arrow C-C of FIG. 2. The electric wire path 20 is formed in a substantially cylinder shape, and at an end of the cylinder, an electric wire hole 30 that is opened in a substantially circle shape is formed. The electric wire hole 30 is opened in the substantially horizontal direction, and the electric wire 60 (see FIG. 1) passing through the electric wire path 20 is passed through the electric wire hole 30. The electric wire path 20 is formed over the frame 12 and the under cover 13 in the casing 10. Accordingly, the electric wire path 20 has a first divided part 21 formed on the frame 12 side of the electric wire path 20, and a second divided part 22 formed on the under cover 13 side of the electric wire path 20. In other words, the electric wire path 20 is divided into the first divided part 21 formed in the frame 12, and the second divided part 22 formed in the under cover 13. By attaching the under cover 13 to the frame 12, the first divided part 21 and the second divided part 22 are combined to form the electric wire path 20.

The electric wire path 20 is divided, so that the electric wire hole 30 serving as an opening of the electric wire path 20 is also divided. In other words, the electric wire hole 30 is divided into a first half hole part 31 formed in the first divided part 21 of the electric wire path 20, and a second half hole part 35 formed in the second divided part 22 of the electric wire path 20. The electric wire hole 30 formed in a substantially circular shape is divided into the first half hole part 31 and the second half hole part 35, so that the first half hole part 31 and the second half hole part 35 each have a substantially semicircular shape. In other words, the first half hole part 31 is in the shape of a semicircle forming the upper half portion of the electric wire hole 30, and the second half hole part 35 is in the shape of a semicircle forming the lower half portion of the electric wire hole 30. With the under cover 13 attached to the frame 12, the first divided part 21 and the second divided part 22 are combined to form the electric wire path 20, whereby the first half hole part 31 and the second half hole part 35 are also combined to form the electric wire hole 30.

Figure 5:
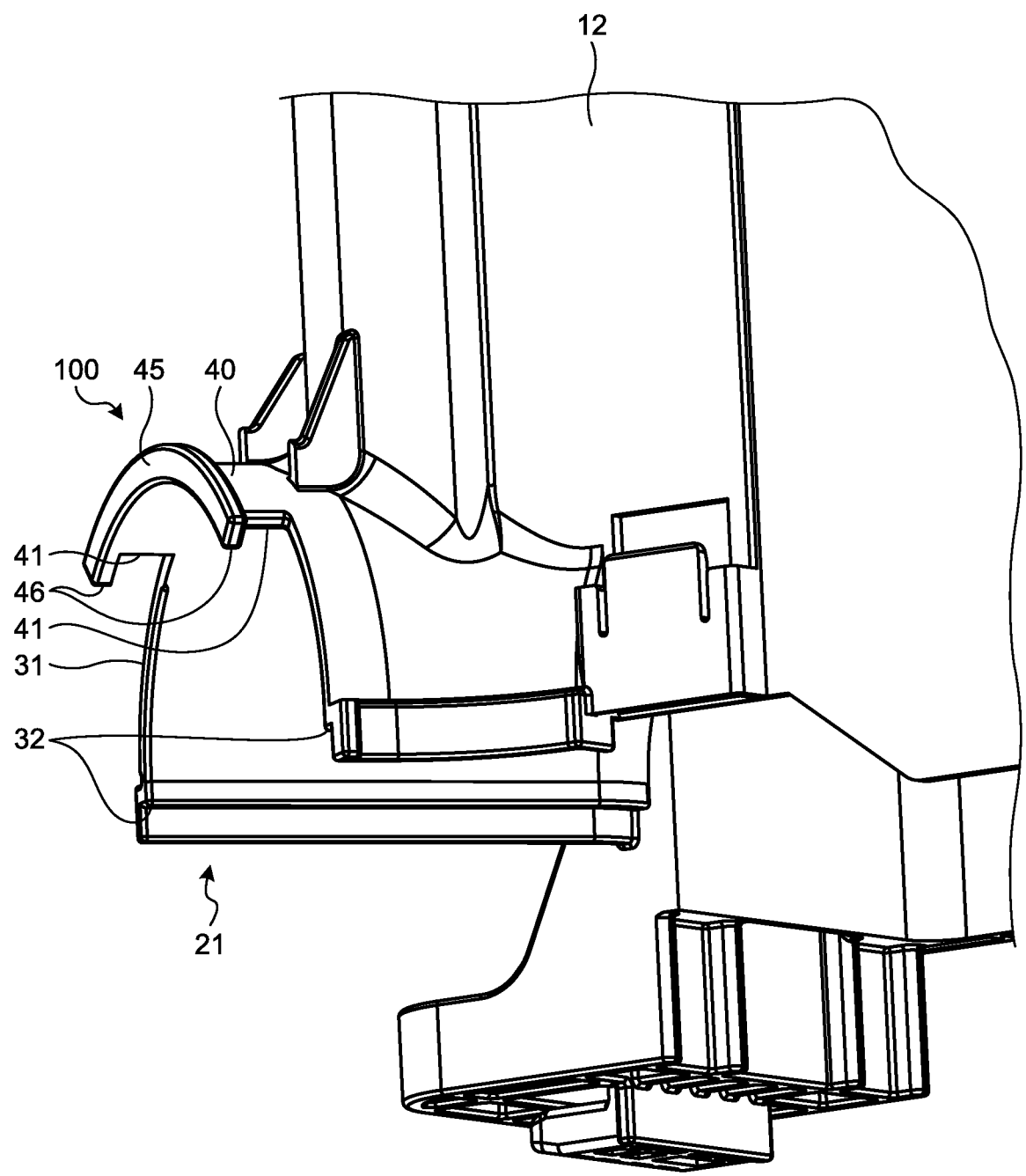
FIG. 5 is a perspective view of a first divided part illustrated in FIG. 2.
Figure 6:
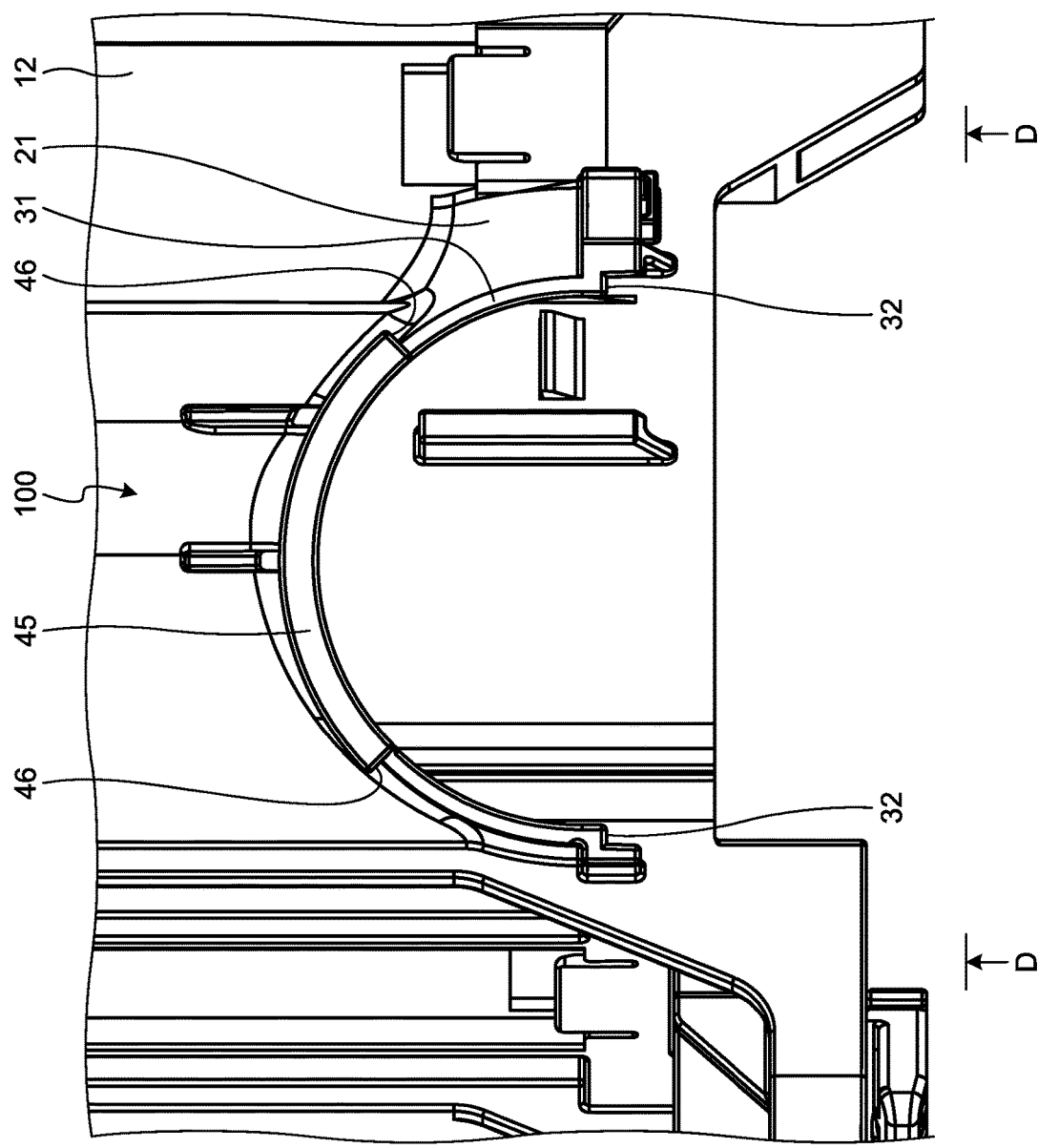
FIG. 6 is a front view of a first half hole part illustrated in FIG. 5.
Figure 7:
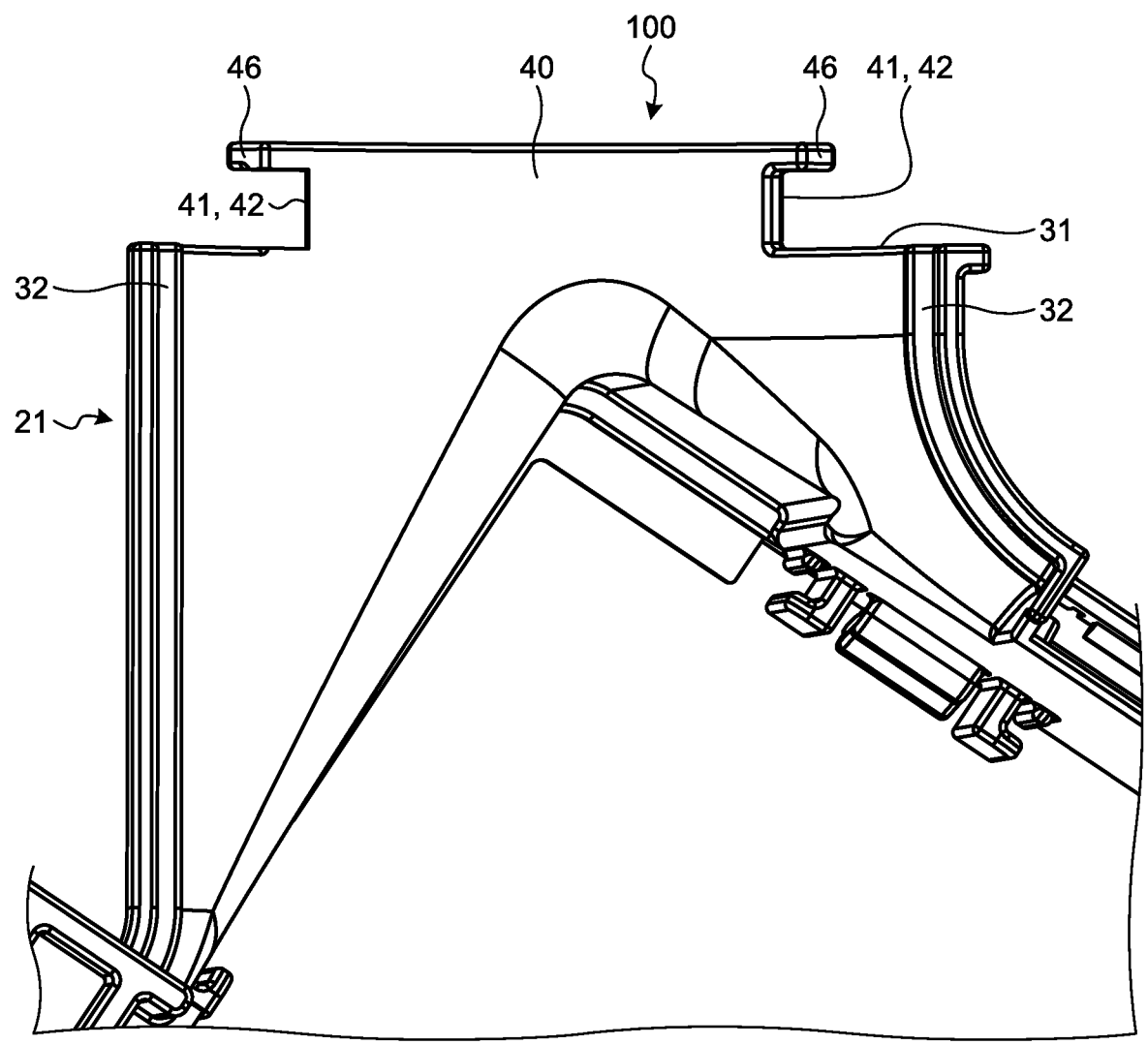
FIG. 7 is a diagram viewed from the direction of arrow D-D of FIG. 6.

FIG. 5 is a perspective view of the first divided part 21 illustrated in FIG. 2. FIG. 6 is a front view of the first half hole part 31 illustrated in FIG. 5. FIG. 7 is a diagram viewed from the direction of arrow D-D of FIG. 6. An electric wire fixing part 40 is arranged in the first half hole part 31. The electric wire fixing part 40 is a part for fixing the electric wire 60 (see FIG. 9), and thus, the electric wire path 20 has an electric wire fixing structure 100 according to the present embodiment. The electric wire fixing structure 100 according to the present embodiment includes the first half hole part 31 and the second half hole part 35 (see FIG. 2), the electric wire fixing part 40, a hook rim part 45, and a fixing member 50 described later (see FIG. 8 and FIG. 9). The electric wire fixing part 40 extends from the first half hole part 31 in the axial direction of the circle that is the shape of the electric wire hole 30 (see FIG. 2), and the electric wire fixing part 40, when viewed in the axial direction of the electric wire hole 30, has a shape formed along the first half hole part 31. In other words, the electric wire fixing part 40 protrudes from the first half hole part 31 toward a side opposite to the first divided part 21, and extends in the axial direction of the electric wire hole 30.

The electric wire fixing part 40 is formed in a part of a range in the circumferential direction of the first half hole part 31 that is formed in a substantially semicircular shape. More specifically, the electric wire fixing part 40 is formed in a range in the circumferential direction of the first half hole part 31, the range being such that both ends 41 of the electric wire fixing part 40 in the circumferential direction of the first half hole part 31 are provided apart from both ends 32 of the first half hole part 31 in the circumferential direction of the first half hole part 31. In the present embodiment, the electric wire fixing part 40 is arranged in the vicinity of the upper edge of the first half hole part 31, and the distance between one end 41 of the electric wire fixing part 40 and one end 32, which is in a side closer to the one end of 41, of the first half hole part 31 is substantially the same as the distance between another end 41 of the electric wire fixing part 40 and another end 32, which is in a side closer to the another one end 41, of the first half hole part 31. In other words, the electric wire fixing part 40 is arranged in a position near a center of a range in the circumferential direction of the first half hole part 31.

The electric wire fixing part 40 has a hook rim part 45 formed at an edge on the side opposite to the first half hole part 31 in the axial direction of the electric wire hole 30. In other words, the hook rim part 45 is arranged at the edge of the electric wire fixing part 40 in the axial direction of the electric wire hole 30. The hook rim part 45 is formed at the edge, in the axial direction of the electric wire hole 30, of the electric wire fixing part 40 so as to have a predetermined thickness in the axial direction of the electric wire hole 30.

Furthermore, the hook rim part 45 protrudes by a predetermined width from the electric wire fixing part 40 radially outward of the semicircle that is the shape of the first half hole part 31, or radially outward of a circle that is the shape of the electric wire hole 30. In other words, the hook rim part 45 is formed in a substantially plate or band shape, the thickness direction of which corresponds to the axial direction of the electric wire hole 30, the width direction of which corresponds to the radial direction of the electric wire hole 30, the shape curving along the electric wire fixing part 40 when viewed in the axial direction of the electric wire hole 30.

The hook rim part 45 curving along the electric wire fixing part 40 is formed in a range in the circumferential direction of the first half hole part 31, the range being larger than a range in which the electric wire fixing part 40 is formed in the circumferential direction of the first half hole part 31. In other words, the hook rim part 45 has ends 46 in the circumferential direction of the first half hole part 31, the ends 46 protruding in the circumferential direction of the first half hole part 31 with respect to the electric wire fixing part 40 so as to be closer to the ends 32 of the first half hole part 31 than to the ends 41 of the electric wire fixing part 40. Here, the distance between one end 46 of the hook rim part 45 and one end 41 of the electric wire fixing part 40, which is closer to the one end 46, is substantially the same as the distance between the other end 46 of the hook rim part 45 and the other end 41 of the electric wire fixing part 40, which is closer to the another end 46.

The electric wire fixing part 40 provided with the hook rim part 45 at the edge thereof is formed such that each of the ends 46 of the hook rim part 45 further protrudes in the circumferential direction of the first half hole part 31 than the ends 41 of the electric wire fixing part 40, and therefore, when the electric wire fixing part 40 and the hook rim part 45 are viewed as one integrated part, both ends of the part in the circumferential direction of the first half hole part 31 are notched in the circumferential direction Thus, when the electric wire fixing part 40 and the hook rim part 45 are viewed as one integrated part, each of the ends 41 of the electric wire fixing part 40 is a portion notched by a notch 42 formed at each end in the circumferential direction of the first half hole part 31.

The electric wire fixing structure 100, the electrical connection box 1, and the wire harness WH according to the present embodiment have the above-described configuration. The actions of the electric wire fixing structure 100, the electrical connection box 1, and the wire harness WH are now described. The electric wire 60 is passed through the electric wire path 20 under a state in which the frame 12 and the under cover 13 are not combined to each other, and accordingly, the electric wire path 20 is divided into the first divided part 21 and the second divided part 22. Here, since the electronic components 5 and other components to be accommodated in the electrical connection box 1 are accommodated in the frame 12, the electric wire 60 to pass through the divided electric wire path 20 is passed through the first divided part 21 serving as a part provided on the frame 12 side of the electric wire path 20.

Figure 8:
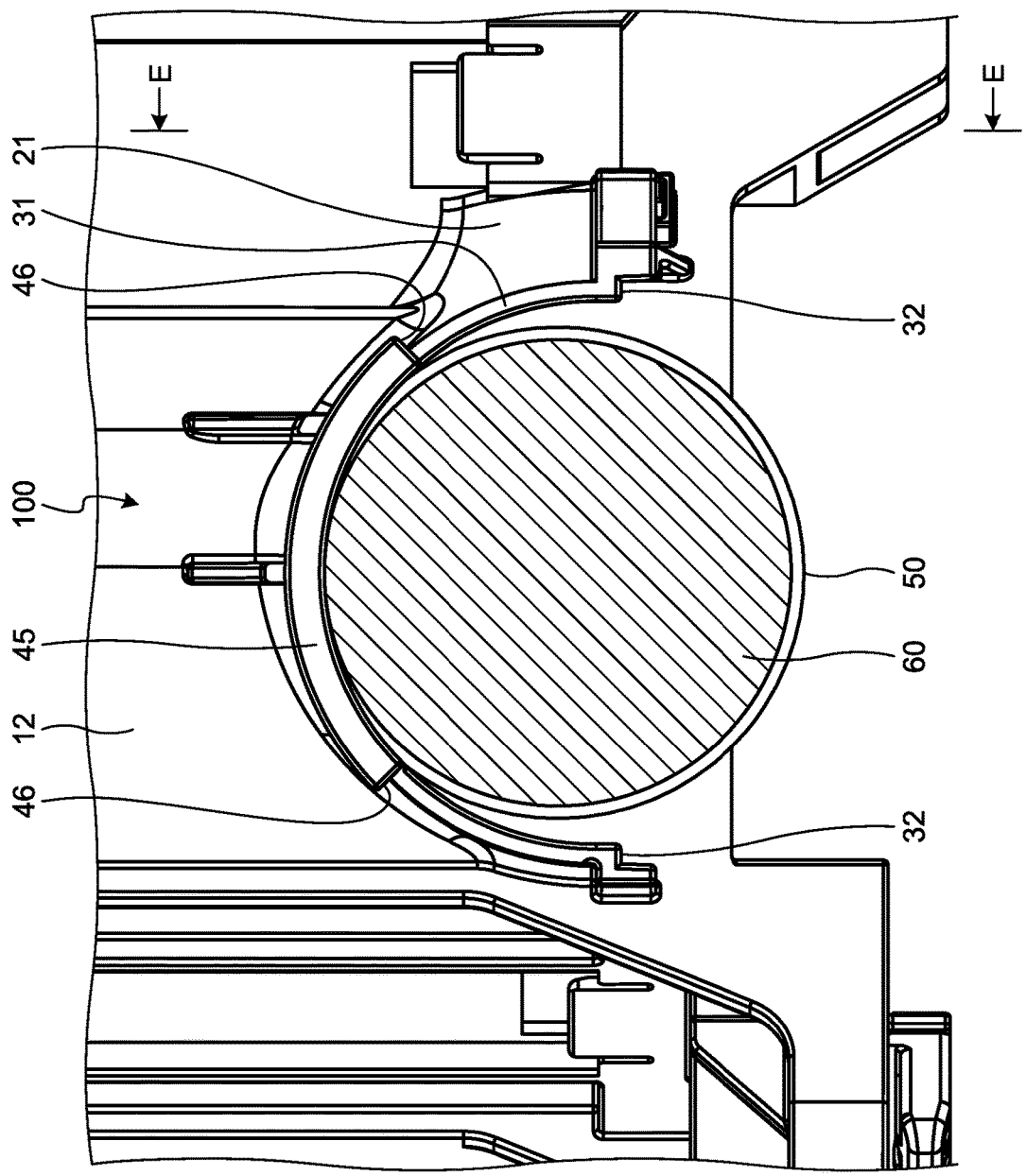
FIG. 8 is a diagram for explaining a state in which an electric wire is fixed to an electric wire fixing part.
Figure 9:
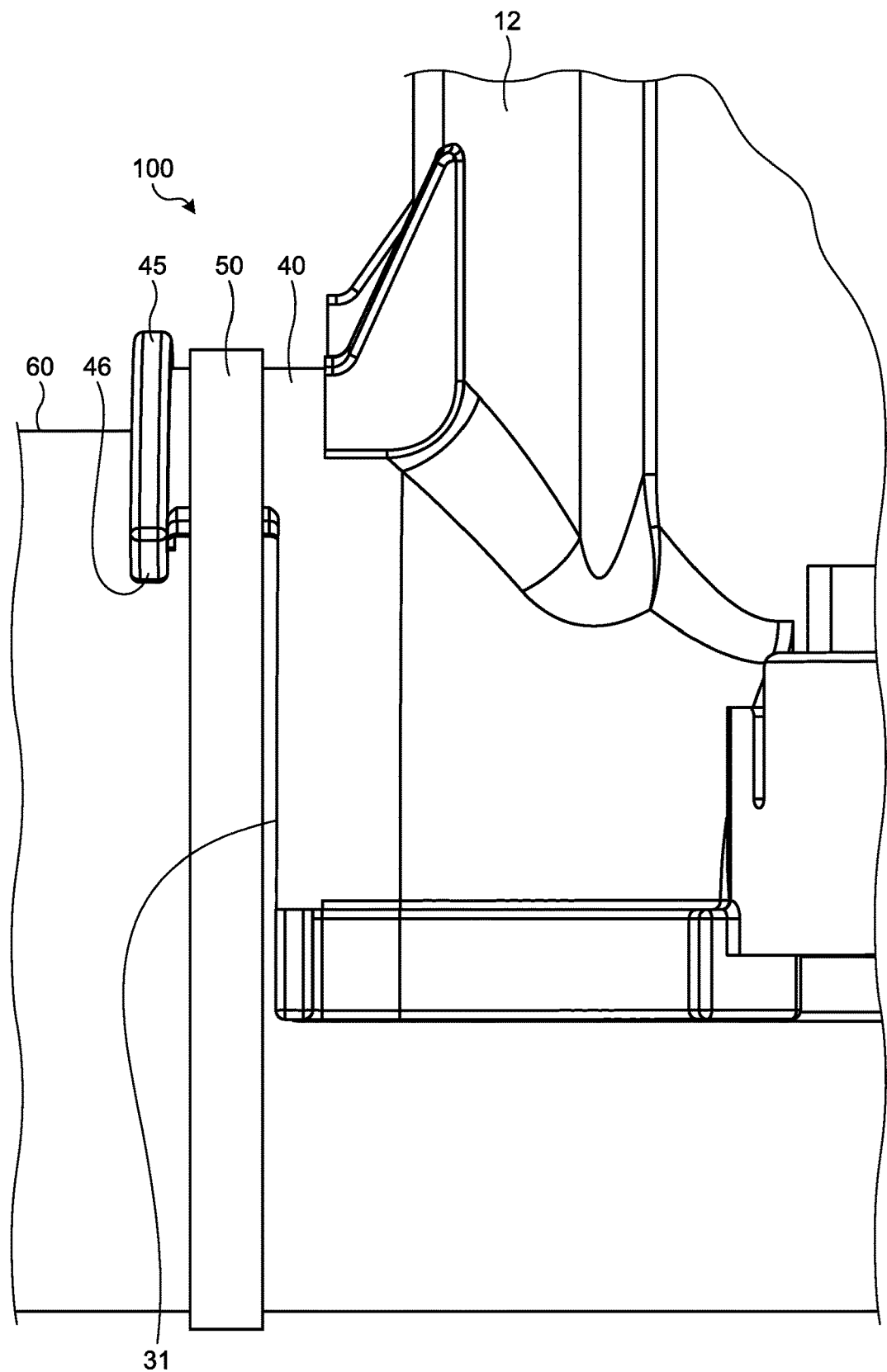
FIG. 9 is a diagram viewed from the direction of arrow E-E of FIG. 8.

FIG. 8 is a diagram for explaining a state in which the electric wire 60 is fixed to the electric wire fixing part 40. FIG. 9 is a diagram viewed from the direction of arrow E-E of FIG. 8. The electric wire 60 to pass through the first divided part 21 is passed from the inside of the frame 12 through the first divided part 21 on the inner circumferential surface side of the first divided part 21, and is routed from the first half hole part 31 to the outside of the frame 12. Thus, the electric wire 60 routed from the first half hole part 31 to the outside of the frame 12 through the first divided part 21 on the inner circumferential surface side of the first divided part 21 is fixed to the electric wire fixing part 40 by the fixing member 50. The fixing member 50 to fix the electric wire 60 to the electric wire fixing part 40 is formed of a band-shaped member, such as a stretchable rubber band or what is called a cable tie made of resin. The fixing member 50 is wound around the electric wire 60 and the electric wire fixing part 40 together to fix the electric wire 60 to the electric wire fixing part 40.

The electric wire fixing part 40 wound by the fixing member 50 protrudes from the first half hole part 31 toward the side opposite to the first divided part 21, and thus the fixing member 50 is wound around the electric wire 60 and the electric wire fixing part 40 together at a position which is located in the vicinity of the first half hole part 31 and at which the electric wire fixing part 40 is arranged in the axial direction of the electric wire hole 30. More specifically, the fixing member 50 is wound such that the fixing member 50 is passed on the outer circumferential surface side of the electric wire fixing part 40, the electric wire fixing part 40 being formed in a shape along the first half hole part 31 when viewed in the axial direction of the electric wire hole 30, and the fixing member 50 is wound along the outer circumference of the electric wire 60 routed on the inner circumferential surface side of the first divided part 21. Thus, the fixing member 50 is wound around the electric wire 60 and the electric wire fixing part 40 together to fix the electric wire 60 to the electric wire fixing part 40.

In other words, the fixing member 50 is wound around the electric wire 60 and the electric wire fixing part 40 together at a position between the first half hole part 31 and the hook rim part 45 in the axial direction of the electric wire hole 30, thereby fixing the electric wire 60 to the electric wire fixing part 40. Since the hook rim part 45 protrudes from the electric wire fixing part 40 radially outward toward the outside of a semicircle that is the shape of the first half hole part 31, the hook rim part 45 prevents the fixing member 50, which is wound around the outer circumferential surface of the electric wire fixing part 40, from moving in the axial direction of the electric wire hole 30.

When the fixing member 50 is wound around the electric wire 60 and the electric wire fixing part 40, tension is generated in the fixing member 50, and this tension causes the electric wire 60 to come closer to the electric wire fixing part 40. The electric wire fixing part 40 is apart from both the ends 32 of the first half hole part 31 and arranged in the vicinity of the upper edge of the first half hole part 31, and therefore, in the case where the electric wire 60 is closer to and fixed to the electric wire fixing part 40, the electric wire 60 is fixed in a state of being closer to the upper edge side of the first half hole part 31. Thus, the electric wire 60 is fixed in a state of being apart from both the ends 32 of the first half hole part 31.

Figure 10:
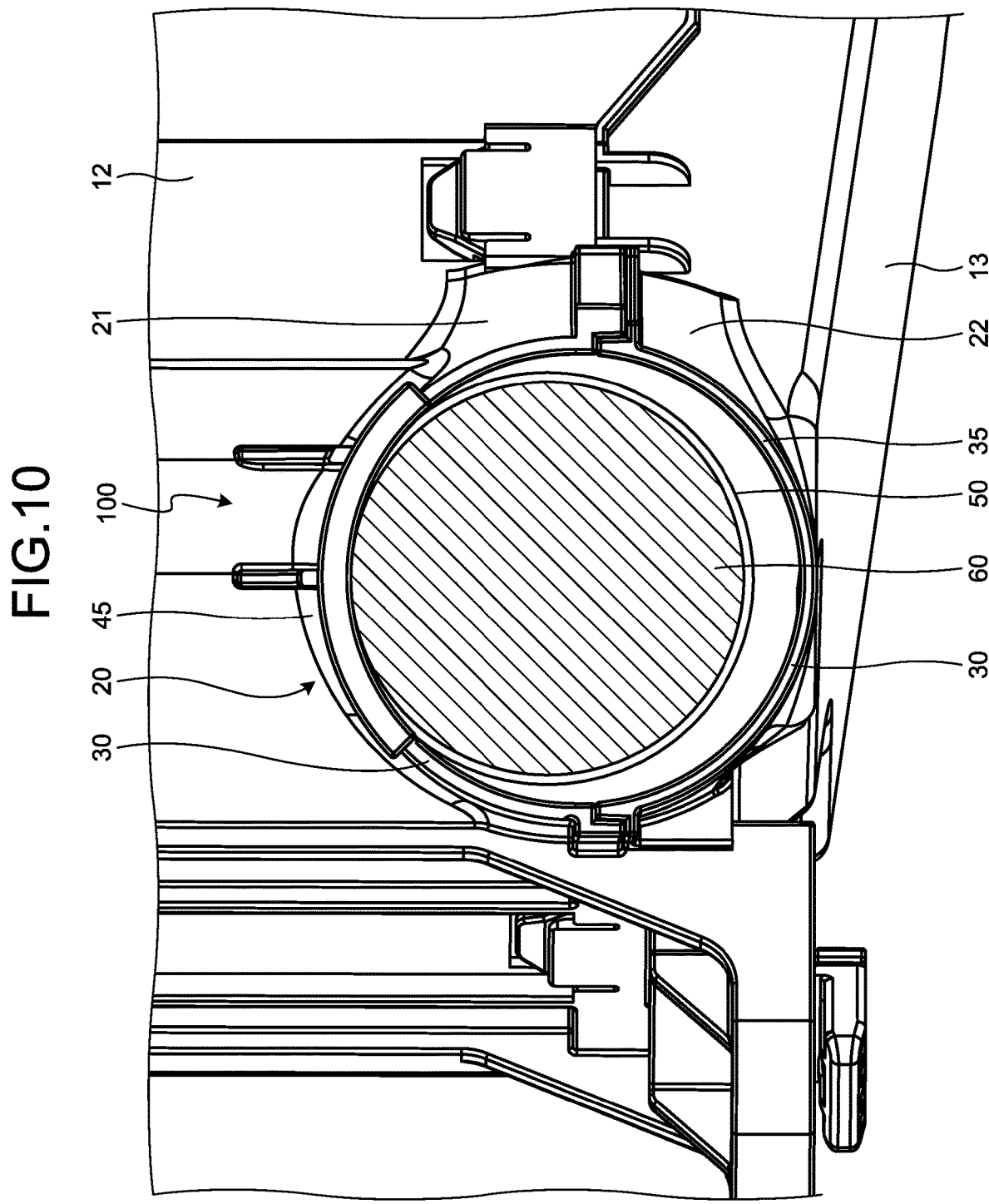
FIG. 10 is a diagram for explaining a state in which an under cover is attached to a frame illustrated in FIG. 8.

FIG. 10 is a diagram for explaining a state in which the under cover 13 is attached to the frame 12 illustrated in FIG. 8. After the electric wire 60 is fixed to the electric wire fixing part 40 by the fixing member 50, the under cover 13 is attached to the frame 12. The under cover 13 is provided with the second divided part 22 of the electric wire path 20, and therefore, when the under cover 13 is attached to the frame 12, the first divided part 21 of the frame 12 and the second divided part 22 of the under cover 13 are also combined, accordingly. Thus, the electric wire path 20 is formed, and at the end of the electric wire path 20, the electric wire hole 30 is formed with the first half hole part 31 of the first divided part 21 and the second half hole part 35 of the second divided part 22.

Here, the electric wire 60 fixed to the electric wire fixing part 40 by the fixing member 50 is closer to the upper edge side of the first half hole part 31, and fixed in a state of being apart from both the ends 32 of the first half hole part 31, and therefore, the second half hole part 35 is combined to the first half hole part 31, without catching the electric wire 60 therebetween. Thus, the electric wire 60 to pass through the electric wire path 20 is passed from the electric wire hole 30 to the outside of the frame 12, and thus the electric wire 60 is routed through the electric wire hole 30 over the inside and outside of the casing 10.

In the electric wire fixing structure 100 according to the embodiment described above, the electric wire fixing part 40 is formed in a range in the circumferential direction of the first half hole part 31, the range being such that both the ends 41 of the electric wire fixing part 40 are apart from both the ends 32 of the first half hole part 31. Furthermore, the electric wire 60 is fixed to the electric wire fixing part 40 by the fixing member 50. Thus, the electric wire 60 can be apart from the ends 32 of the first half hole part 31. Thus, when the first half hole part 31 is combined to the second half hole part in a state in which the electric wire 60 is fixed to the electric wire fixing part 40, the electric wire 60 can be prevented from being sandwiched between the end 32 of the first half hole part 31 and the second half hole part 35. As a result, the electric wire 60 can be prevented from being caught.

Furthermore, the hook rim part 45 is formed in the electric wire fixing part 40, thereby preventing the fixing member 50 to fix the electric wire 60 to the electric wire fixing part 40 from coming off the electric wire fixing part 40. Thus, the electric wire 60 can be more firmly fixed to the electric wire fixing part 40 by the fixing member 50. As a result, the electric wire 60 can be more surely prevented from being caught.

In the circumferential direction of the first half hole part 31, the range in which the hook rim part 45 is formed is larger than a range in which the electric wire fixing part 40 is formed. Therefore, regardless of the size of the electric wire 60 viewed in the axial direction of the electric wire hole 30, that is, regardless of the thickness of the electric wire 60 to pass through the electric wire hole 30, the fixing member 50, around which the electric wire 60 and the electric wire fixing part 40 are wound together, can be prevented from coming off the electric wire fixing part 40. Thus, regardless of the thickness of the electric wire 60, the fixing member 50 can more firmly fix the electric wire 60 to the electric wire fixing part 40. As a result, regardless of the thickness of the electric wire 60, the electric wire 60 can be more surely prevented from being caught.

In the electrical connection box 1 according to the embodiment, the electric wire fixing structure 100 according to the present embodiment is used for the casing 10 that accommodates the electronic components 5, and thus, with being apart from the ends 32 of the first half hole part 31, the electric wire 60 can be fixed to the electric wire fixing part 40, and the electric wire 60 can be prevented from being pinched between the ends 32 of the first half hole part 31 and the second half hole part 35. As a result, the electric wire 60 can be prevented from being caught.

The wire harness WH according to the embodiment includes the routing material W having conductivity and the electrical connection box 1. Furthermore, in the electrical connection box 1, the electric wire fixing structure 100 according to the present embodiment is used for the casing 10. Thus, with being apart from the ends 32 of the first half hole part 31, the electric wire 60 can be fixed to the electric wire fixing part 40. As a result, the electric wire 60 can be prevented from being caught.

Modifications

In the above-described embodiment, examples of the fixing member 50 to fix the electric wire 60 to the electric wire fixing part 40 include a rubber band and a cable tie made of resin, but, other members except them may be used as the fixing member 50. For example, an adhesive tape may be used as the fixing member 50. The fixing member 50 may have any aspect as long as the member is capable of appropriately fixing the electric wire 60 to the electric wire fixing part 40.

Furthermore, in the above-described embodiment, the electric wire fixing part 40 is arranged around a center portion in a range in the circumferential direction of the first half hole part 31, but, a position at which the electric wire fixing part 40 is arranged may be deviated to either end, in the circumferential direction, of the first half hole part 31. As long as both the ends 41 of the electric wire fixing part 40 are arranged to be apart from both of the ends 32 of the first half hole part 31, the electric wire fixing part 40 may be arranged at any position in the circumferential direction of the first half hole part 31. Similarly, a position at which the hook rim part 45 is arranged in the circumferential direction of the first half hole part 31 may be deviated with respect to the electric wire fixing part 40.

The electric wire fixing structure, the electrical connection box, and the wire harness according to the present embodiment have a configuration in which the electric wire fixing part is formed in a range in the circumferential direction of a first half hole part, the range being such that both ends of the electric wire fixing part are apart from both ends of the first half hole part, and an electric wire is fixed to the electric wire fixing part by a fixing member, and accordingly, the electric wire can be apart from the ends of the first half hole part. Thus, an electric wire can be prevented from being pinched between the ends of the first half hole part and a second half hole part when the first half hole part and the second half hole part are combined in a state in which the electric wire is fixed to the electric wire fixing part. As a result, the effect of preventing the electric wire from being caught is achieved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electric wire fixing structure; comprising:
a first half hole part and a second half hole part forming an electric wire hole through which an electric wire is passed;
an electric wire fixing part formed in a shape along the first half hole part when viewed in an axial direction of the electric wire hole, the electric wire fixing part extending from the first half hole part in the axial direction of the electric wire hole; and
a fixing member wound around the electric wire and the electric wire fixing part together, so as to fix the electric wire to the electric wire fixing part, wherein
the electric wire fixing part is formed in a circumferential direction of the first half hole part such that both ends of the electric wire fixing part in the circumferential direction of the first half hole part are formed apart from both ends of the first half hole part in the circumferential direction of the first half hole part,
both ends of the second half hole part respectively engage directly with the both ends of the first half hole part to form intersection portions such that gaps are formed, in the circumferential direction, between the intersection portions and the electric wire,
the electric wire hole is opened in a substantially circle shape,
the first half hole part is in a shape of a semicircle forming an upper half portion of the electric wire hole, and the second half hole part is in a shape of a semicircle forming a lower half portion of the electric wire hole,
the first half hole part includes a first outer cylindrical surface,
the electric wire fixing part has a second outer cylindrical outer surface that is concentric and continuous with the first outer cylindrical surface,
the fixing member is wound onto the second outer cylindrical surface,
a hook rim part to prevent the fixing member from moving in the axial direction of the electric wire hole is formed at an edge of the electric wire fixing part, the edge being on a side of the fixing member opposite to the first half hole part in the axial direction of the electric wire hole, and
a distance between one end to another end of the hook rim part in the circumferential direction of the first half hole part is larger than a distance between one end to another end of the electric wire fixing part in the circumferential direction of the first half hole part.

2. An electrical connection box; comprising:
a casing that accommodates an electronic component; and
an electric wire fixing structure provided to the casing, wherein
the electric wire fixing structure includes
a first half hole part and a second half hole part forming an electric wire hole through which an electric wire is passed;
an electric wire fixing part formed in a shape along the first half hole part when viewed in an axial direction of the electric wire hole, the electric wire fixing part extending from the first half hole part in the axial direction of the electric wire hole; and
a fixing member wound around the electric wire and the electric wire fixing part together, so as to fix the electric wire to the electric wire fixing part, wherein
the electric wire fixing part is formed in a circumferential direction of the first half hole part such that both ends of the electric wire fixing part in the circumferential direction of the first half hole part are formed apart from both ends of the first half hole part in the circumferential direction of the first half hole part,
both ends of the second half hole part respectively engage directly with the both ends of the first half hole part to form intersection portions such that gaps are formed, in the circumferential direction, between the intersection portions and the electric wire,
the electric wire hole is opened in a substantially circle shape,
the first half hole part is in a shape of a semicircle forming an upper half portion of the electric wire hole, and the second half hole part is in a shape of a semicircle forming a lower half portion of the electric wire hole, the first half hole part includes a first outer cylindrical surface, the electric wire fixing part has a second outer cylindrical outer surface that is concentric and continuous with the first outer cylindrical surface, the fixing member is wound onto the second outer cylindrical surface, a hook rim part to prevent the fixing member from moving in the axial direction of the electric wire hole is formed at an edge of the electric wire fixing part, the edge being on a side of the fixing member opposite to the first half hole part in the axial direction of the electric wire hole, and a distance between one end to other end of the hook rim part in the circumferential direction of the first half hole part larger than a distance between one end to other end of the electric wire fixing part in the circumferential direction of the first half hole part.

3. A wire harness; comprising:

a routing material having conductivity; and an electrical connection box connected to the routing material, wherein the electrical connection box includes a casing that accommodates an electronic component, and an electric wire fixing structure provided to the casing, the electric wire fixing structure includes a first half hole part and a second half hole part forming an electric wire hole through which an electric wire is passed;

an electric wire fixing part formed in a shape along the first half hole part when viewed in an axial direction of the electric wire hole, the electric wire fixing part extending from the first half hole part in the axial direction of the electric wire hole; and a fixing member wound around the electric wire and the electric wire fixing part together, so as to fix the electric wire to the electric wire fixing part, wherein the electric wire fixing part is formed in a circumferential direction of the first half hole part such that both ends of the electric wire fixing part in the circumferential direction of the first half hole part are formed apart from both ends of the first half hole part in the circumferential direction of the first half hole part, both ends of the second half hole part respectively engage directly with the both ends of the first half hole part to form intersection portions such that gaps are formed, in the circumferential direction, between the intersection portions and the electric wire, the electric wire hole is opened in a substantially circle shape, the first half hole part is in a shape of a semicircle forming an upper half portion of the electric wire hole, and the second half hole part is in a shape of a semicircle forming a lower half portion of the electric wire hole, the first half hole part includes a first outer cylindrical surface, the electric wire fixing part has a second outer cylindrical outer surface that is concentric and continuous with the first outer cylindrical surface, the fixing member is wound onto the second outer cylindrical surface, a hook rim part to prevent the fixing member from moving in the axial direction of the electric wire hole is formed at an edge of the electric wire fixing part, the edge being on a side of the fixing member opposite to the first half hole part in the axial direction of the electric wire hole, and a distance between one end to other end of the hook rim part in the circumferential direction of the first half hole part larger than a distance between one end to other end of the electric wire fixing part in the circumferential direction of the first half hole part.

\* \* \* \* \*